United States Patent [19]
Rohee

[11] Patent Number: 5,224,781
[45] Date of Patent: Jul. 6, 1993

[54] SLIDE FOR A VEHICLE SEAT COMPRISING A DEVICE FOR REDUCING PLAY AND NOISE

[75] Inventor: René Rohee, Orne, France

[73] Assignee: Bertrand Faure Automobile "BFA", Essone, France

[21] Appl. No.: 915,940

[22] Filed: Jul. 17, 1992

[30] Foreign Application Priority Data

Jul. 19, 1991 [FR] France .................. 91 09162

[51] Int. Cl.⁵ .................................... F16C 29/04
[52] U.S. Cl. ........................................... 384/34
[58] Field of Search ............... 384/34, 18, 19, 42, 384/54, 49

[56] References Cited

U.S. PATENT DOCUMENTS 4,511,187  4/1985  Rees ........................... 384/18
4,556,186  12/1985  Langmesser et al. .......... 384/34
4,756,503  7/1988  Fujita ........................... 384/34

FOREIGN PATENT DOCUMENTS 3056165  12/1980  Fed. Rep. of Germany.

Primary Examiner—Lenard A. Footland
Attorney, Agent, or Firm—Robert W. Becker & Associates

[57] ABSTRACT

A damping element is provided between bulges of the vertically upwardly extending end sections of the side portions of an upside down U-shaped upper profiled member and the side portions and legs of the upper and lower profiled members. The damping element is made of a deformable semi-flexible material and firmly maintains the upper and lower profiles with respect to one another both in a vertical direction and in a transverse direction.

2 Claims, 2 Drawing Sheets

SLIDE FOR A VEHICLE SEAT COMPRISING A DEVICE FOR REDUCING PLAY AND NOISE

FIELD OF THE INVENTION

The invention relates to a slide arrangement for a vehicle seat, comprising a device for reducing play and eliminating noise.

BACKGROUND OF THE INVENTION

Slide arrangements have already been used for a very long time in automobile vehicles for adjustment of the front-rear position of a seat. Arrangements are known which comprise:

a central slide placed in the longitudinal axis of the seat for its front and rear adjustment;

an assembly of two slides placed on each side of the seat for the same front and rear adjustment, these slides being generally identical insofar as it is possible to place them correctly on the floor of the vehicle.

In order to make these slides, profiled members have been manufactured with mating shapes so that the lower profiled member, fixed directly or indirectly to the vehicle floor, is formed with legs having a shape related to that of the mobile upper profiled member of the slide the side portions of which are also adapted so as to cooperate with the legs of the fixed profile. Between the fixed profiled member and the mobile profiled member either on one side or on both sides, at least one ball is placed between cylindrical braces, having the same diameter as the ball, so as to facilitate a sliding of the mobile upper profiled members with respect to the fixed lower profiled members, these two profiled members constituting the slide as such.

In spite of extensive research on the cross-sectional shape of the fixed and mobile profiled members, and their mounting with the assistance of balls and braces, see particularly DE-A-3 046 165, there exists so far no slide arrangement with a suitable reduction of play that causes noise, which noise adds to the noise produced by the car body, the engine and the transmission of the engine movement to the wheels.

It is an object of the present invention to provide a slide arrangement which in a simple manner eliminates the disadvantages caused by play and noise by providing a slide arrangement comprising a simple and deformable damping element which considerably limits play and therefore noise.

SUMMARY OF THE INVENTION

According to the invention, the slide for a vehicle seat, comprising a device for reducing play and eliminating noise, is composed of a lower profiled member of a U-shaped cross-section with legs having free ends which are inclined outwardly and form a central hollow recess adapted for serving as a guide for balls and braces for providing an easy displacement, on a top portion of the lower profile, a reversed U-shaped upper profiled member having side portions which are curved at a right angle and then straightened up vertically and form bulges placed opposite vertical portions of the lower profiled member, wherein on an inner side of the slide there is provided latching means for locking the upper profiled member with respect to the lower profiled member in a manner known per se, and wherein, on an outer side of the slide, between the bulges and the legs and side portions of the upper and lower profiled members, there is placed a damping element made of a deformable semi-flexible material that maintains firmly the upper and lower profiled members with respect to one another both in a vertical direction and in a transverse direction, thereby avoiding play and therefore noise inherent to play.

The slide arrangement for a vehicle seat according to the present invention is primarily characterized by:

a lower profiled member of a U-shaped cross-section with legs having free ends that form an outwardly bent portion having a central recess, with the legs and the outwardly bent portions defining a groove;

an upper profiled member of an upside down U-shaped cross-section with side portions having free ends each forming an inwardly bent portion extending at a right angle relative to the side portions, the inwardly bent portion having a vertically upwardly extending end section with a bulge, the upper profiled member connected to the lower profiled member such that the vertically upwardly extending end sections engage the groove and define an inner space delimited by the end section, the inwardly bent portion, and the outwardly bent portion;

a damping element made of a deformable semi-flexible material, the damping element inserted into the inner space and supporting the lower profiled member and the upper profiled member relative to one another in a vertical and a horizontal direction, the damping element being a continuous member of a length that corresponds to a length of the lower and the upper profiled members, the damping element having a 5-shaped cross-section with a top cross-bar, a vertically extending stem and a U-shaped bottom half, with the bottom half positioned between the side portion and the bulge and resting at the inwardly bent portion and with the top cross-bar resting at the outwardly bent portion;

at least one ball and braces inserted into the central recess for providing an easy displacement between the lower and the upper profiled members; and latching means connected to the lower profiled member and the upper profiled member for locking the lower and the upper profiled members relative to one another.

Preferably, the deformable semi-flexible material is resistant to water and grease.

Various other features of the invention will become more apparent from the following detailed description.

BRIEF DESCRIPTION OF THE DRAWINGS

An embodiment of the invention is shown by way of a non-limiting example in the accompanying drawings, wherein.

DESCRIPTION OF THE PREFERRED EMBODIMENTS

Figure 1:
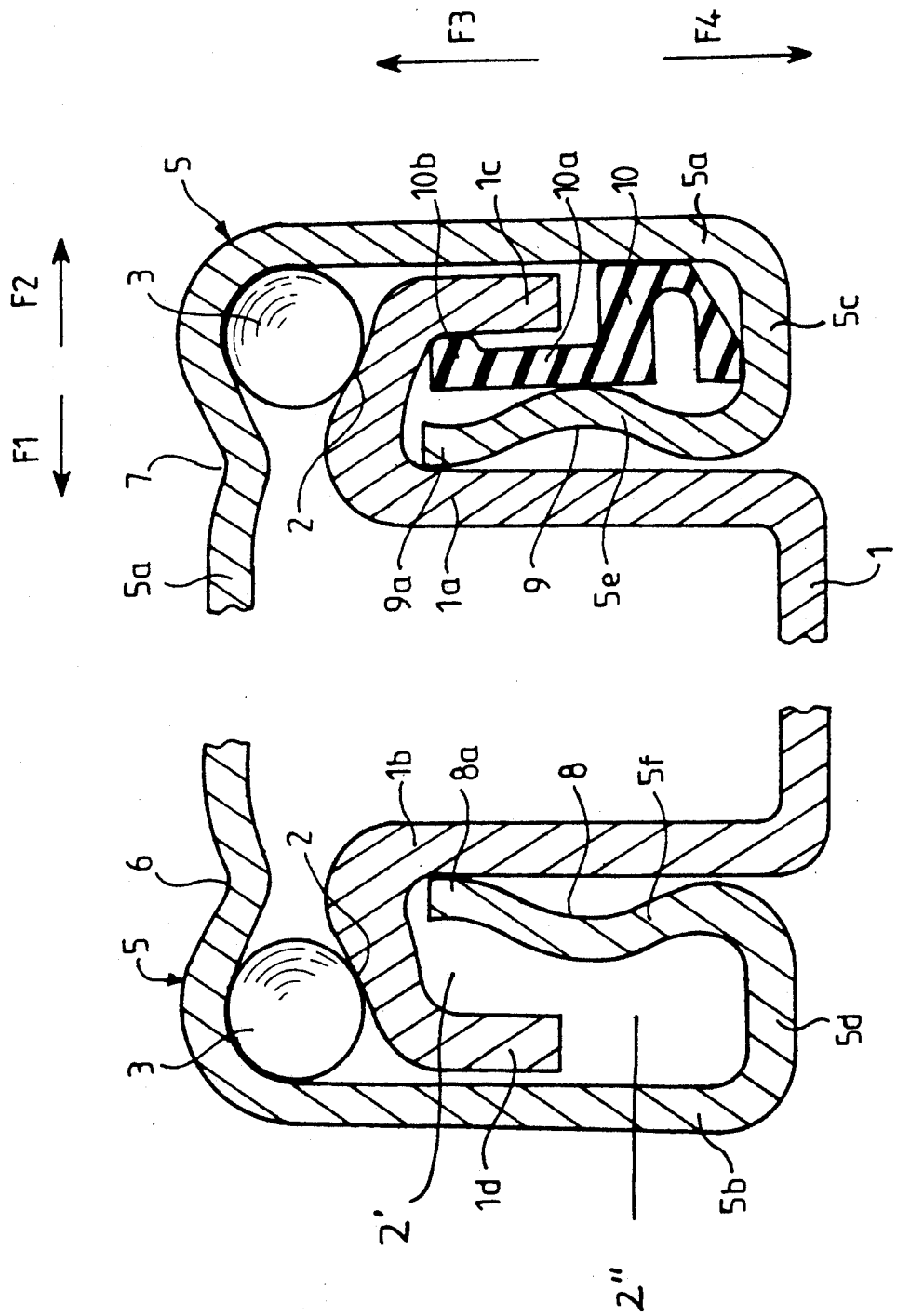
FIG. 1 is a cross-sectional view of a slide according to the invention.
Figure 2:
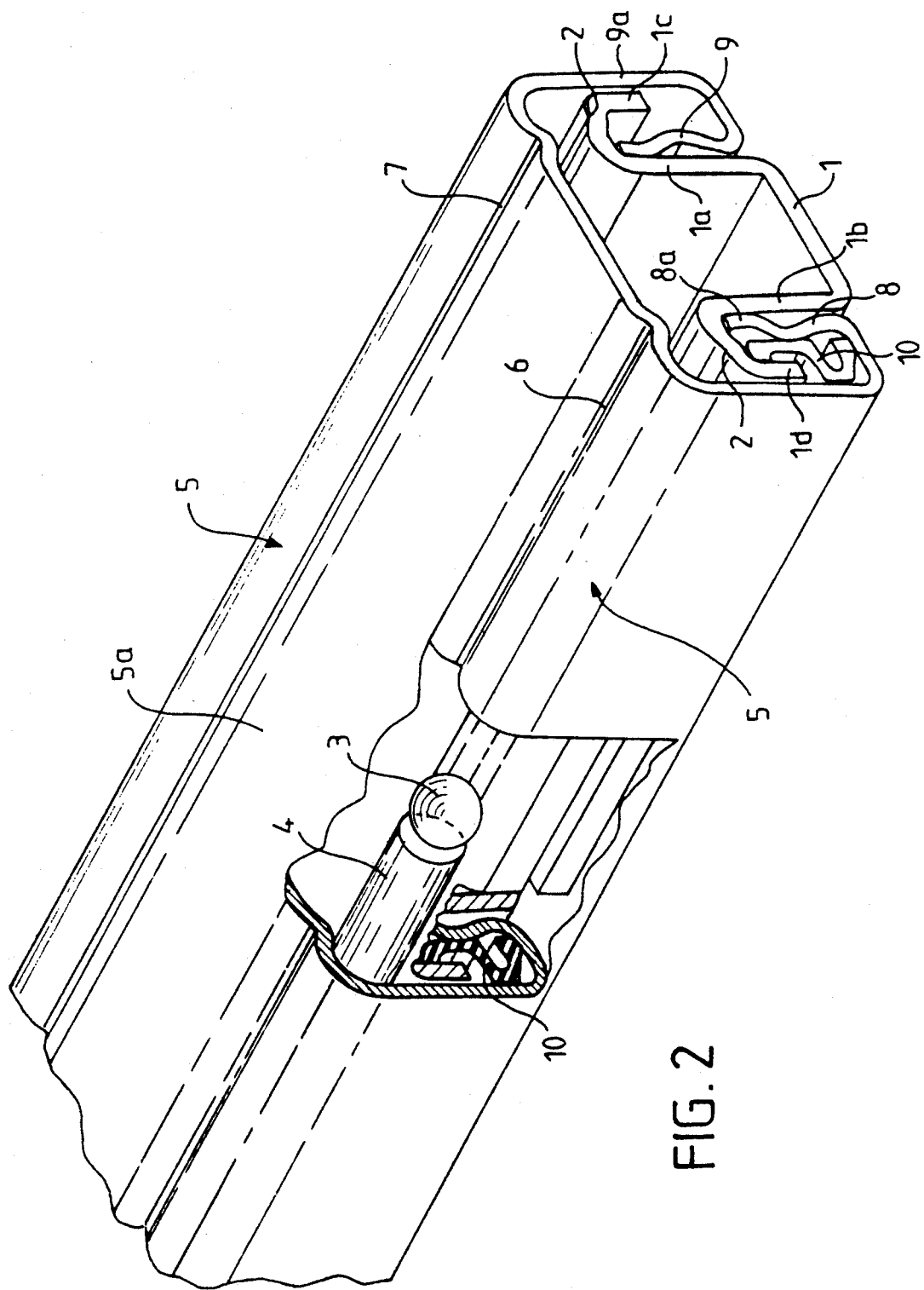
FIG. 2 is a perspective view of a slide having centrally a cut-away portion showing the slide made according to the invention.

Referring now to the drawings, FIG. 1 shows a slide arrangement comprising a U-shaped lower profiled member 1 having legs 1a, 1b the free ends of which form an outwardly bent portion having a central recess 2, adapted for serving as a guide, on the one hand, for at least one ball 3 and, on the other hand, for braces 4 (see FIG. 2).

The ends of the outwardly bent portions 1c, 1d of the legs 1a, 1b of the lower profiled member are bent vertically downwardly, parallel to the legs 1a, 1b and a groove 2' is formed therebetween.

The upper profiled member 5 of the slide arrangement has substantially in cross-section the shape of an upside down U the upper portion 5a of which is comprised of two grooves 6, 7 symmetrically arranged with respect to the central plane of the upper profiled member 5 and which are used for stiffening the upper profiled member 5.

The side portions 5a, 5b of the upper profiled member 5 are curved at a right angle to form inwardly bent portions 5c, 5d and then bent substantially vertically to form end sections 5e, 5f, provided in their median zone with bulges 8, 9 so that, when the upper profiled member 5 is positioned on the lower profiled member 1, the ends 8a, 8b will come into slight engagement with the outer upper portion of the legs 1a, 1b of the lower profiled member 1. The end sections 5e, 5f, the inwardly bent portion 5c, 5d, and the outwardly bent portion 1c, 1d enclose an inner space 2".

Finally, there is placed between the bulges 9 of the upper profiled member 5 and the vertical end of the outwardly bent portion 1c of the lower profiled member 1 a damping element 10, which, in the illustrated embodiment, has in cross-section substantially the shape of the figure five (5) and which is made of a deformable semi-flexible material, resisting the agents, particularly water and greases, placed inside sliding portions of the slide arrangement made of the profiled members 1 and 5.

Since the U-shaped bottom half of the damping element 10 is clamped inside the inner space 2" between the lower profiled member 1 and the upper profiled member 5, and since the vertical stem 10a comes to bear against the bulge 9 and since furthermore the top cross-bar 10b bears against the vertical end of the outwardly bent portion 1c of the fixed lower profiled member 1, the transverse play in the direction of arrows $F_1$, $F_2$ (FIG. 1) and the vertical play in the direction of arrows $F_3$, $F_4$ (FIG. 1) are suppressed or at least lessened, thereby avoiding the creation of noise by a mutual contact of the metallic parts. At the same time a gentle and perfectly progressive sliding motion of the mobile upper profiled member 5 with respect to the fixed lower profiled member 1 is provided.

The outer portion of the slide (left hand side portion in FIG. 1), has no damping element since this side of the slide carries latching members permitting locking of the upper profiled member 5 with respect to the lower profiled member 1, that is, a longitudinal adjustment of the seat placed on the slide or assembly of slides.

Actually, when the arrangement is formed with two slides, damping elements 10, placed in the inner space 2" of the slides, but opposite to one another, complete the suppression of the play and noise.

Since the damping element 10 is used practically over the entire length of the slide, it is possible to make simpler profiled members with respect to both the lower profiled member 1 and the upper profiled member 5, thereby reducing the manufacturing costs.

Moreover, and as previously mentioned, the use of a damping element 10 on only one side of the slide results in the possibility of twisting and false parallelism of the slides due to the non-flatness of the vehicle floor and/or to mounting of these slides underneath the seats, creating also frequently a false parallelism.

The present invention is, of course, in no way restricted to the specific disclosure of the specification and drawings, but also encompasses any modifications within the scope of the appended claims.

What I claim is:

1. A slide arrangement for a vehicle seat, comprising:
a lower profiled member of a U-shaped cross-section with legs having free ends that form an outwardly bent portion, said outwardly bent portion having a central recess, with said legs and said outwardly bent portions defining a groove;
an upper profiled member of an upside down U-shaped cross-section with side portions having free ends each forming an inwardly bent portion extending at a right angle relative to said side portions, said inwardly bent portion having a vertically upwardly extending end section with a bulge, said upper profiled member connected to said lower profiled member such that said vertically upwardly extending end sections engage said groove and define an inner space delimited by said end section, said inwardly bent portion, and said outwardly bent portion;
a damping element made of a deformable semi-flexible material, said damping element inserted into said inner space and supporting said lower profiled member and said upper profiled member relative to one another in a vertical and a horizontal direction, said damping element being a continuous member of a length that corresponds to a length of said lower and said upper profiled members, said damping element having a 5-shaped cross-section with a top cross-bar, a vertically extending stem and a U-shaped bottom half, with said bottom half positioned between said side portion and said bulge and resting at said inwardly bent portion and with said top cross-bar resting at said outwardly bent portion;
at least one ball and braces inserted into said central recess for providing an easy displacement between said lower and said upper profiled members; and
latching means connected to said lower profiled member and said upper profiled member for locking said lower and said upper profiled members relative to one another.

2. A slide arrangement according to claim 1, wherein said deformable semi-flexible material is resistant to water and grease.

* * * * *

UNITED STATES PATENT AND TRADEMARK OFFICE
CERTIFICATE OF CORRECTION

PATENT NO. : 5,224,781

DATED      : July 6, 1993

INVENTOR(S) : Rohee

It is certified that error appears in the above-identified patent and that said Letters Patent is hereby corrected as shown below:

On the title page, item [75], "Orne" should read --La Chapelle Biche--.

Signed and Sealed this

Twenty-first Day of June, 1994

Attest:

BRUCE LEHMAN

Attesting Officer

Commissioner of Patents and Trademarks